Dec. 19, 1967  C. J. SWET  3,358,453
PLUG NOZZLE ROCKET
Filed May 26, 1961  4 Sheets-Sheet 1

CHARLES J. SWET
INVENTOR

BY
ATTORNEYS

Dec. 19, 1967

C. J. SWET 3,358,453

PLUG NOZZLE ROCKET

Filed May 26, 1961

CHARLES J. SWET
INVENTOR

BY
ATTORNEYS

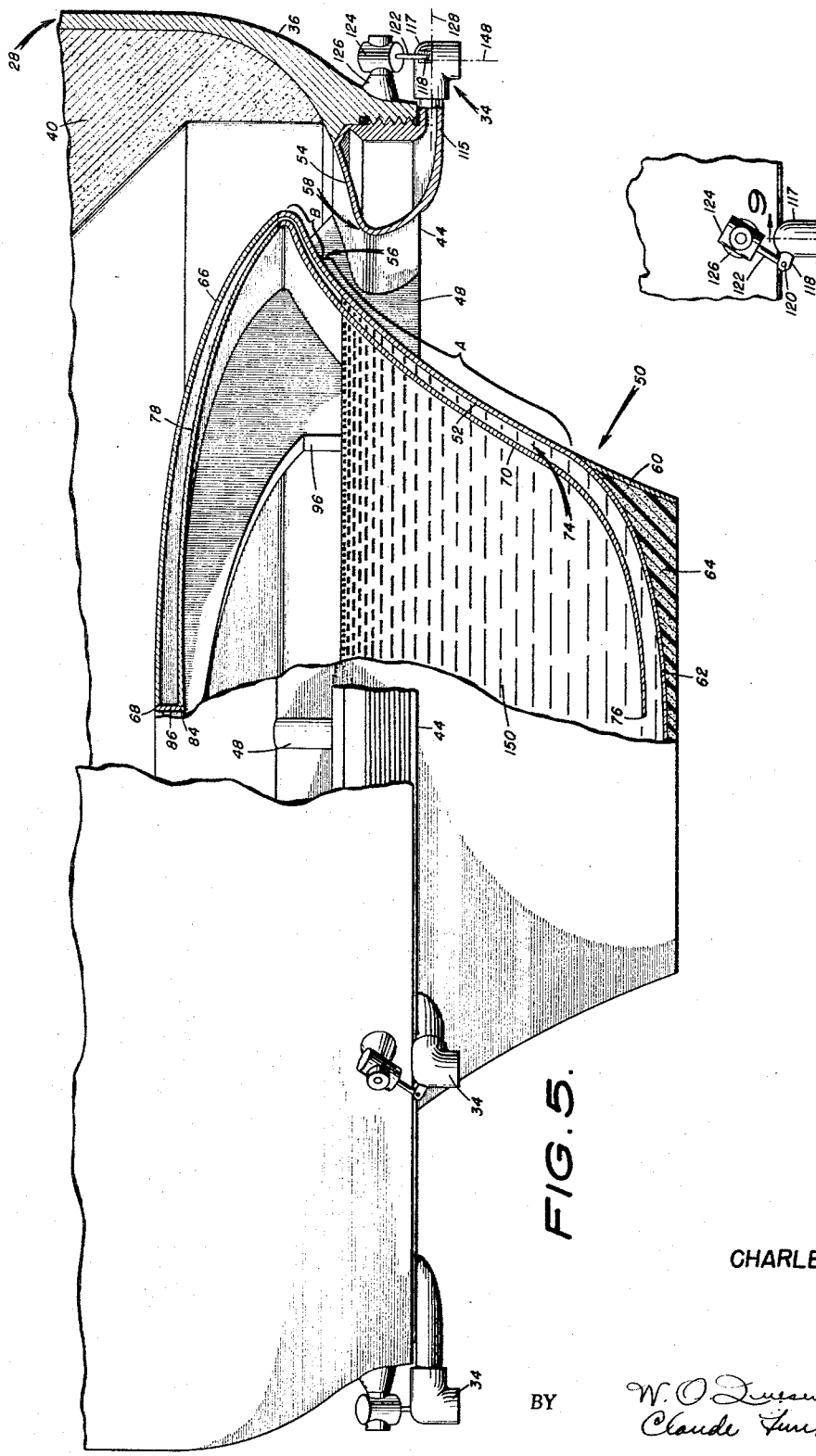

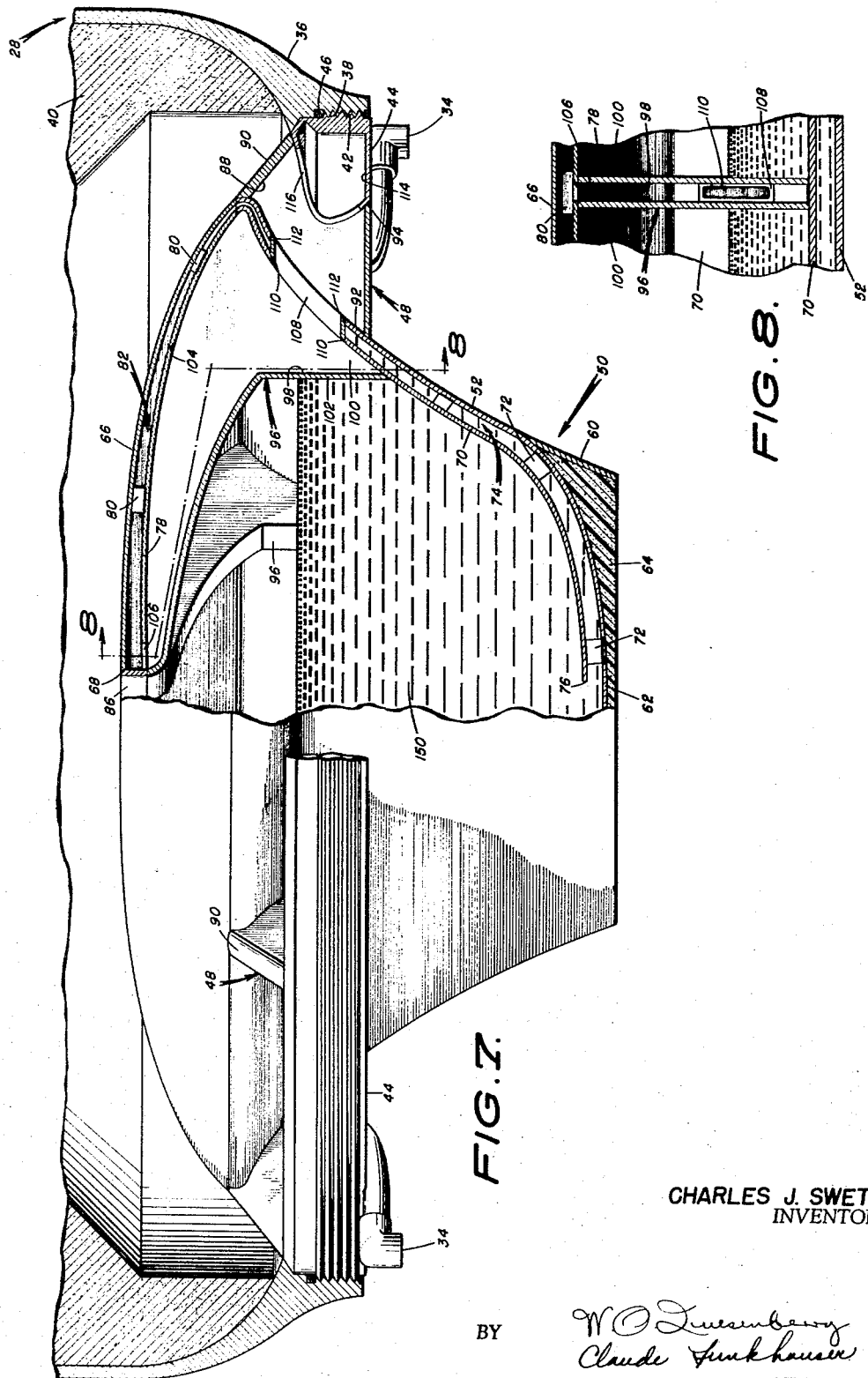

United States Patent Office 3,358,453
Patented Dec. 19, 1967

3,358,453
PLUG NOZZLE ROCKET
Charles J. Swet, Silver Spring, Md., assignor to the United States of America as represented by the Secretary of the Navy
Filed May 26, 1961, Ser. No. 113,045
7 Claims. (Cl. 60—225)

This invention relates generally to rocket motors; more specifically, it relates to a solid propellant rocket motor of the plug nozzle type, in which the plug nozzle is cooled by a fluid which also serves to provide limited attitude control of a missile propelled by the rocket motor.

Attention has recently been given to the utilization of plug nozzles in large solid propellant rocket motors. The theoretical performance advantages of a plug nozzle over a conventional convergent-divergent exhaust nozzle are numerous; they include more efficient rocket performance, reductions in overall missile dimensions for the same operational requirements, economies in construction, and greater simplicity in overall design, the latter contributing substantially to increased reliability. However, the problems arising in providing adequate cooling for the components of such nozzles are substantial, and have tended to delay their actual use in missile rocket motors. The present invention is directed to a fluid-cooled plug nozzle configuration, in which the fluid utilized to cool the nozzle components is also employed to provide limited attitude control over the missile propelled by the rocket motor.

The principal object of this invention, therefore, is to provide a cooled plug nozzle for use with rocket engines where very high temperature reaction gases are present, said nozzle and its supporting structure being so constructed that the exterior surfaces thereof are cooled by the flow of a fluid coolant.

Another object of the invention is to provide a fluid cooled plug nozzle for use with rocket motors, and so constructed that after the fluid coolant has served its cooling function it is utilized to provide limited attitude control of a missile propelled by said motor.

Still another object of the invention is to provide a fluid cooled plug nozzle for rocket motors which is so constructed that after the coolant has served its cooling function it is utilized to provide thrust augmentation.

A further object of the invention is to provide a fluid cooled plug nozzle for rocket motors which is so constructed as to be operated by the heat and pressure of reaction gases issuing from said motor.

It is also an object of this invention to provide a mechanically uncomplicated and economical to construct cooled plug nozzle for use with solid propellant rocket motors.

Other objects and many of the attendant advantages of this invention will be readily appreciated as the same becomes better understood by reference to the following detailed description when considered in connection with the accompanying drawings, wherein:

FIG. 5 is an enlarged detail section on line 5—5 of FIG. 4, with a portion of the missile in elevation particularly showing the interior of the plug nozzle and the construction of the coolant expulsion nozzles of the invention;

FIG. 6 is an enlarged detail elevation further showing the construction of one of the coolant expulsion nozzles;

FIG. 7 is an enlarged detail section on the line 7—7 of FIG. 4, with a portion of the nozzle in elevation, showing in particular the supporting structure and the coolant flow passageways of the plug nozzle of the invention;

FIG. 8 is a cross-section taken generally on the line 8—8 of FIG. 7, further showing the construction of the flow passageways.

The plug nozzle of the present invention includes an isentropically tapered plug member supported by a plurality of struts within an annular nozzle throat in the aft end of a rocket motor casing. The plug member is hollow, and initially a quantity of coolant material is disposed therewithin. Reaction gases resulting from combustion of the rocket motor's propellant are admitted to the interior of the plug and serve to force the coolant, which by then is in a fluid state, successively through cooling passageways contained within the plug member, the struts and the annular nozzle throat. After the coolant has served its cooling function it is exhausted from the annular throat through a plurality of rotatable nozzles, providing attitude control and an added degree of propulsive thrust for the missile propelled by the rocket motor.

Figure 1:
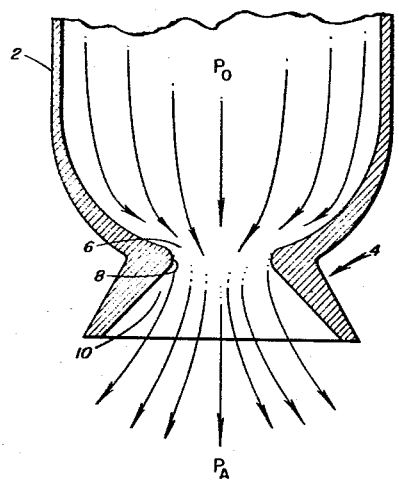
FIG. 1 is a diagrammatic representation of a conventional convergent-divergent nozzle.
Figure 2:
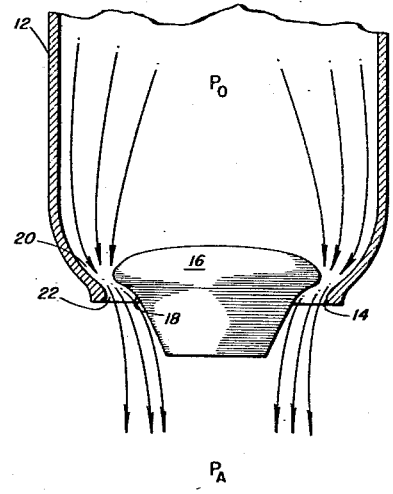
FIG. 2 is a diagrammatic representation of a plug nozzle, showing the principle of operation thereof.

In order to provide a better understanding of the structure and operation thereof, a conventional convergent-divergent nozzle and a plug nozzle are shown diagrammatically in FIGS. 1 and 2, respectively, wherein the arrows represent the flow direction of reaction gases, and $P_o$ and $P_a$ represent respectively gas pressure within the rocket chamber and atmospheric pressure.

Referring to FIG. 1, a rocket casing or chamber 2 is shown provided with a conventional nozzle 4 having a convergent section 6, a throat 8, and a frusto-conical divergent section 10. Combustion gases at a pressure $P_o$ flow through the nozzle and are accelerated by convergent section 6 to sonic velocity at the throat 8. The gases then expand against the frusto-conical surface of divergent section 10 to atmospheric pressure $P_a$.

In FIG. 2 a rocket casing 12 is shown having an opening 14 in the axial end thereof within which is concentrically disposed a plug member 16, the outer surface 18 of which is isentropically tapered. The confronting surfaces of the plug 16 and rocket casing 12 are shaped to define an annular convergent nozzle section 20 and a nozzle throat 22. Reaction gases at a pressure $P_o$ flow through the plug nozzle and are accelerated within the annular convergent section 20 to sonic velocity at the annular throat 22, after which they expand externally about the isentropically tapered surface 18 of plug 16 to atmospheric pressure $P_a$. A comparison of FIGS. 1 and 2 readily shows the differences between conventional nozzles and plug nozzles of the type to which this invention relates.

Figure 3:
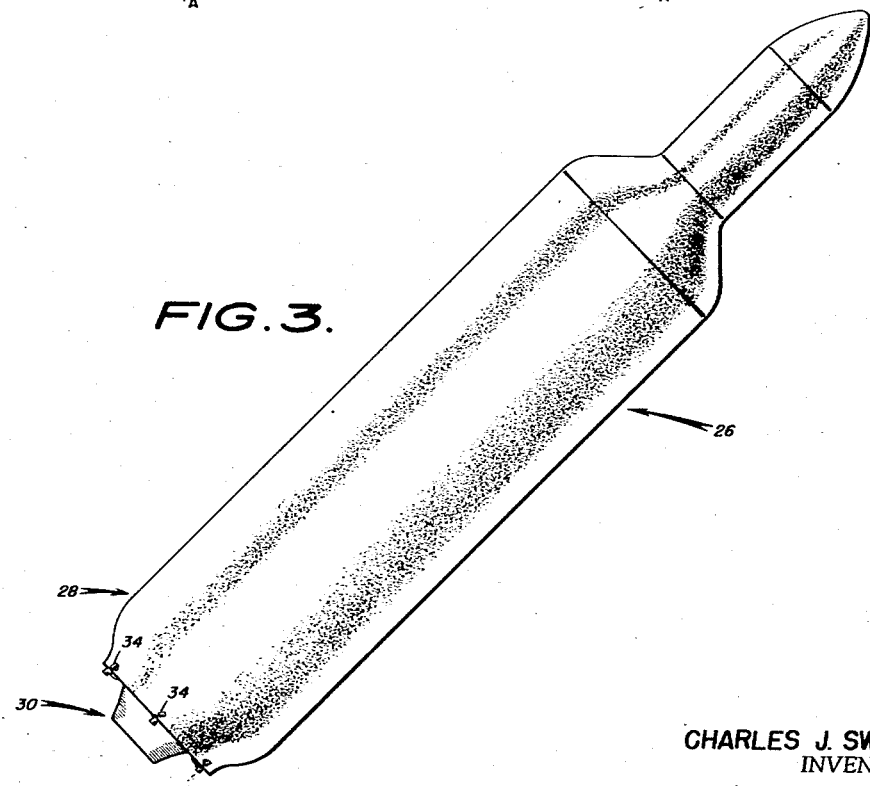
FIG. 3 is a perspective of a missile employing the plug nozzle of the invention.

Rocket motors employing plug nozzles may be utilized as power plants for propelling guided missiles, such a missile being shown at 26 in FIG. 3. In FIG. 3 a rocket motor 28, which includes a plug nozzle 30, is shown attached to the missile 26. A plurality of circumferentially-spaced rotatable coolant expulsion nozzles 34 are mounted about the periphery of the aft end of the rocket motor 28, the construction and operation of these nozzles being described in detail hereinafter.

Figure 4:
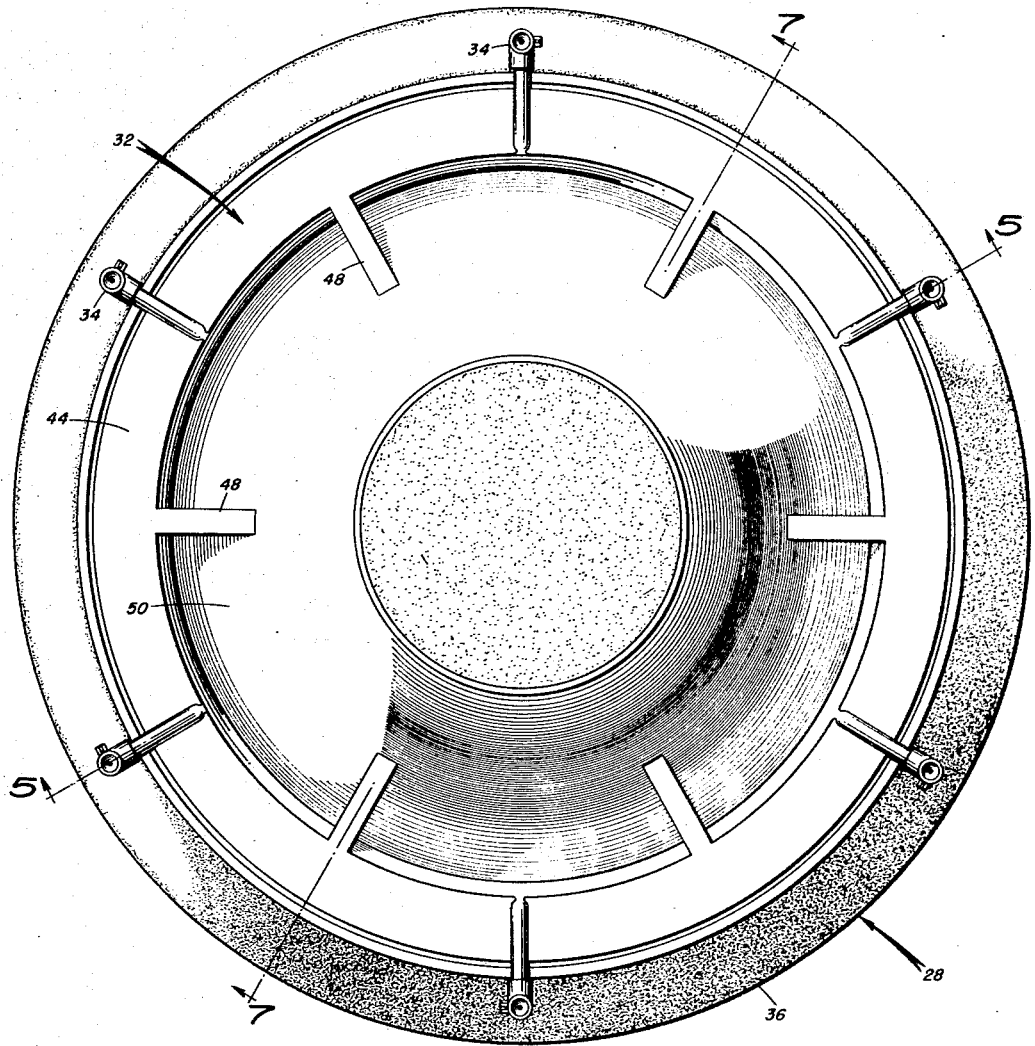
FIG. 4 is an enlarged end elevation of the missile shown in FIG. 3.

As is best shown in FIGS. 4, 5 and 7, the rocket motor 28 includes a casing 36 having a threaded opening 38 in the aft end face thereof, the casing containing a generally cylindrically-shaped charge 40 of a suitable solid propellant. Secured within the opening 38 by screw threads 42 is an annular outer throat member 44, an O-ring 46 being positioned in a peripheral groove on the surface of said member 44 for providing a seal between said throat member and the rocket casing 36. In some instances the use of screw threads to secure the member 44 might be undesirable, and it is to be understood therefore that another securing means, such as a snap-ring and groove arrangement, may be employed without departing from the spirit of the invention.

Supported concentrically within annular member 44 by a plurality of circumferentially spaced struts 48 is a plug member 50, said plug member including a bowl-shaped outer skin 52, the central section A of which is tapered whereby reaction gases will expand thereagainst in a nearly isentropic manner (FIG. 5). The specific taper required for the surface A of the plug member to achieve such isentropic expansion is well known in the art and will not be described in detail. The surface area B of the plug, positioned just above area A, is also tapered and together with the tapered opposing wall section 54 of outer throat member 44, forms a convergent annular nozzle. The distance between the skin 52 and the wall section 54 is at a minimum at points 56 and 58 on the surface of these two elements, and the throat or minimum area of the annular nozzle extends between said two points. Outwardly of point 58 member 44 breaks sharply away from the plug 50, as is readily seen in the drawing.

A generally frusto-conical, thin walled cap 60 is secured to the skin 52 and forms an extension of expansion surface A. The cap 60 may be constructed of a suitable lightweight, heat resistance resinous material, such as the product bearing the trade name Refrasil, or it may be constructed of the same material as the skin 52. In either instance the cap is secured to the outer skin 52 by chemical bonding, welding, or by any other suitable means. The outer skin 52 has a dished bottom 62, and the space defined by the exterior surface of said bottom and the interior surface of the cap 60 is preferably filled with a lightweight plastic foam material 64.

The outer skin 52 terminates just above the area B, and an outer dome 66 is welded thereto. The dome 66 has a curved shape which functions to guide reaction gases into the annular convergent nozzle defined between the outer skin 52 and member 44. Positioned centrally of the outer dome 66 is an opening 68, the purpose of which will be more fully described below.

Disposed within the outer skin 52 is a bowl-shaped liner 70, the shape of which corresponds generally to the configuration of said outer skin. A plurality of spacer blocks 72 are secured to the inner surface of the skin 52 and the outer surface of the liner 70, as by resistance welding, and serve to maintain the liner 70 spaced from the outer skin whereby to define an annular flow passageway 7. The liner 70 has an opening 76 positioned centrally in the bottom thereof which serves to communicate the interior of said liner with the passageway 74. A liner dome 78, similar in shape to dome 66, is secured by welding to the liner 70 and is maintained in spaced relationship with the dome 66 by blocks 80. The blocks 80 are similar to blocks 72 and, together with the opposing walls of the domes 66 and 78, define an annular pasageway 82 which constitutes a continuation of the passageway 74. The liner dome 78 has a central opening 84 therein of the same size as opening 68, and a collar 86 is fitted within the openings 68 and 84 and is welded to the outer dome and the liner dome. The outer skin 52, liner 70, and domes 66 and 78 may be constructed of may suitable material, such as stainless steel or a molybdenum alloy. The thickness of the material, although exaggerated in the drawings, is small, say 0.015 inch, and the components are therefore relatively easy to shape, as by the process of spinning. As may be seen in the drawings, the space between the walls defining the passageways 74 and 82 varies in width from a minimum near the maximum circumference of the plug member to a maximum near the central axis of said member. The reason for this variation is to maintain a relatively constant cross-sectional area through which fluid may flow, which results in a relatively constant fluid flow velocity through said passageways.

The plug 50 is supported within the annular member 44 by the struts 48, the precise number of struts employed being a matter of design. As is best shown in FIG. 7, the struts 48 have hollow interiors 88, and the upper ends 90 thereof are rounded to facilitate the smooth flow of reaction gases thereover. Each strut is welded at its inboard end 92 to the outer skin 52 of plug 50, and at its outboard end 94 to member 44.

Disposed within the plug 50 and in alignment with each of the struts 48 is an internal brace 96 having a hollow interior 98. The braces 96 extend along radii of the plug 50 and each consist of a pair of spaced side plates 100 which are connected to a base portion 102. The free forward edges 104 of the plates 100 are shaped to abut against the liner 70 and the liner dome 78, and are welded thereto. The liner dome 78 has elongated slot openings 106 therein adjacent collar 86, which confront the hollow interior 98 of each brace 96, whereby said interiors 98 are placed in communication with passageway 82. The interior of each brace 96 is placed in communication with the interior of its associated strut 48 by an elongated in cross-section conduit 108, which conduit is fitted into confronting slot openings 110 and 112 in the inner liner 70 and the outer skin 52, respectively, the conduit extending between said liner and said outer skin and being welded to both. The positions and configurations of openings 106, 110 and 112 and for conduit 108 may be better understood by reference to FIG. 8. The specific sizes and configurations of the braces 96, openings 106, 110 and 112, and conduit 108 are matters of design and depend upon the strength and fluid flow requirements for a specific nozzle design.

The outer throat member 44 has an annular passageway 114 therein which is placed in communication with the interiors 88 of the struts 48 by openings 116 in the wall of said member. Thus, a fluid initially contained within liner 70 may pass through opening 76, passageways 74 and 82, opening 106, the interiors of the braces 96, conduits 108, the interiors of the struts 48, and thence into the outer member 44. The fluid is then discharged from the member 44 through the rotatable nozzles 34, the structure of which will now be described.

Referring again to FIGS. 4, 5, and 7, a plurality of circumferentially spaced, radially-extending nozzle mounts 115 are provided for the annular member 44. While the mounts 115 are shown in the drawings to be integral with the member 44, it is obvious that they may be separately formed and then welded in position. Rotatably secured to each mount 115 is an elbow-shaped nozzle head 117. As is best shown in FIG. 6, each head 117 has a pair of spaced lugs 118 projecting therefrom, to which is pivotally attached by a pin 120 the end of the movable piston 122 of a hydraulic cylinder 124. The hydraulic cylinder 124 is pivotally attached to a mounting base 126 projecting from the casing 36, the piston 122 therein being actuated in response to control signals received from the guidance system of the missile 26 to thereby rotate the nozzle head 117 through a predetermined arc.

Figure 9:
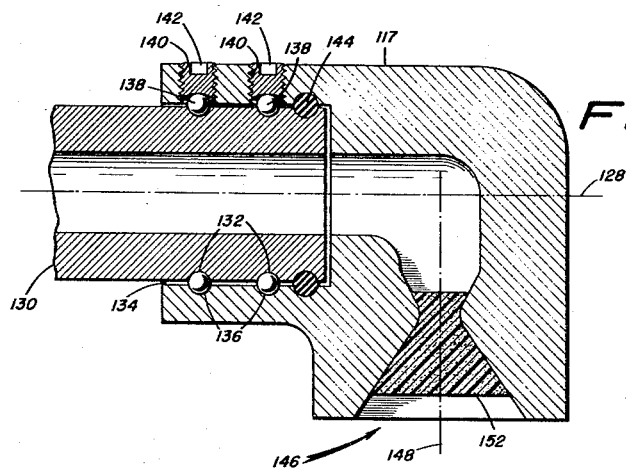
FIG. 9 is an axial section of one of the coolant expulsion nozzles.

The construction of the nozzle head 117 is shown in detail in FIG. 9, which is a view taken on the line 9—9 in FIG. 6. The outer end portion of the nozzle mount 115 lies symmetrically about a radial line 128 extending from the longitudinal central axis of the missile 26, and forms a cylindrical nipple 130 which has a pair of axially spaced peripheral bearing grooves 132 therein. The radially-directed leg of the elbow-shaped nozzle head 117 has an enlarged bore 134 therein of a size to freely receive the nipple 130. A pair of spaced annular bearing grooves 136 are disposed in the cylindrical wall of bore 134 and are positioned opposite the grooves 132. Ball bearings 138 are disposed within the opposed grooves 132 and 136 and function to rotatably mount the nozzle head 117, the ball bearings being inserted through threaded openings 140 which are then fitted with plugs 142 to retain said bearings in position. An O-ring 144 is positioned in confronting grooves on the nipple 130 and within bore 134, and serves to seal the rotating joint.

The open end of the nozzle head 117 contains a convergent-divergent nozzle 146 arranged symmetrically about an axis 148. The axis 148, because the nozzle head 117 is rotatably mounted upon the radially-directed nipple 130, is free to shift about radial axis 128 in a plane lying parallel to the longitudinal axis of the missile. Thus, thrust generated by the flow of gases from nozzle 146 may be directed in any of a number of directions by supplying fluid to the hydraulic cylinder 124 to thereby move the piston 122 and cause the nozzle head 117 to rock.

The interior of the plug 50 is initially filled with a substance 150 which is in a liquid state during operation of the rocket. While a fluid such as water might be advantageously utilized, an initially solid material which would later be transformed to a liquid state for operation of the nozzle is more desirable. A suitable substance would be sodium or lithium. The sodium could be heated and then poured into the plug, where it would harden. When it is desired to launch the missile the sodium could be liquified by heating with an auxiliary heat source, or in most cases the heat generated by the propellant 40 during the first few seconds of its burning could be utilized.

When the substance 150 is liquified and the propellant 40 has been ignited, the following will occur. The burning propellant will generate a great volume of expanding, very hot gases, the majority of which will flow outwardly through the plug nozzle to create thrust. A small quantity of the reaction gases will pass through opening 86 into the interior of plug 50, pressurizing the same. The resultant pressure will act upon fluid substance 150, forcing it to flow through opening 76, passageways 74 and 82, opening 106, conduit 108, struts 48, and into the outer member 44. From the outer member 44 the pressurized fluid will be discharged to the atmosphere through nozzles 146, creating some degree of thrust. The nozzle heads 117 are rotated to utilize said thrust to either augment the propulsive thrust of the missile or to exert forces to correct the missile's attitude.

The flow of the fluid through the plug nozzle cools the surfaces thereof whereby the very high temperature hot gases flowing thereabout have little adverse effect on the materials thereof. The rate of flow of the fluid is determined by the amount of pressure exerted by the reaction gases and the sizes of the flow passageways. The area of openings 76 and 106, in particular, are important in determining the rate of flow, and may be adjusted in size to give the desired amount of cooling.

The number of nozzle heads 117 employed is to a great extent a matter of choice, so long as a sufficient number are utilized to permit the escape of cooling fluid at a great enough rate and to provide the desired attitude control forces. Each nozzle 146 is initially plugged by a slug 152 of suitable displaceable material, whereby to insure that the fluid substance 150 will not be prematurely released. The slug is, of course, displaced by the pressurized fluid as soon as the same reaches said slug.

While the nozzles 34 are shown to be mounted to produce roll-correcting thrust forces, it is obvious that they may be positioned to exhaust in any of a variety of directions. They may, for example, be fixed to exhaust only in a rearward direction, whereby only to produce additional propulsive thrust. Or they may be mounted to exhaust radially outwardly or inwardly, to thereby give pitch and yaw correcting forces. In any case, the primary purpose of the nozzles is to in some manner utilize the thrust created by the exhaust therethrough of the fluid cooling substance contained in the plug nozzle.

In an actual missile, means would be employed with the plug nozzle of the invention to provide for steering. Such well known devices as jet vanes, auxiliary rockets, or secondary fluid injection might be employed for these steering purposes.

While the plug nozzle of the invention has been described with relation to a solid propellant rocket motor it is to be understood that it might equally well be utilized with other reaction-type motors, such as liquid fuel rockets or even jet engines.

Obviously many modifications and variations of the present invention are possible in the light of the above teachings. It is therefore to be understood that within the scope of the appended claims the invention may be practiced otherwise than as specifically described.

What is claimed:

1. A reaction motor including a casing having an opening therein, means disposed within said casing for generating reaction gases, an annular member secured within said opening and having a plurality of fluid expulsion nozzles, a hollow plug member positioned concentrically within said annular member in spaced relationship thereto and together with said annular member defining a plug nozzle, and a plurality of struts connected to and extending between said annular member and said plug member, the interior of said plug member being in communication through a port therein with the interior of said casing and containing a substance that is fluid at least during operation of the reaction motor, said annular member, said plug member, and said struts having interconnected passageways which are in communication with the interior of said plug member and with said fluid expulsion nozzles, whereby a portion of the gases produced by said reaction gas generating means will flow through said port into the interior of said plug member and will force said fluid to flow through said interconnected passageway means and thence from said fluid expulsion nozzles, said passageways being so positioned that the flow of said fluid therethrough will cool the external surface of said annular member, said plug member, and said struts.

2. A reaction motor as recited in claim 1, wherein said fluid expulsion nozzles are rotatable and are spaced about the circumference of said annular member, whereby the thrust created by the flow of said fluid therefrom may be directed in any of several given directions in a plane lying parallel to the longitudinal axis of said motor.

3. A reaction motor as recited in claim 2, including additionally means for rotating said fluid expulsion nozzles.

4. A reaction motor, including a casing having an opening therein, means disposed within said casing for generating reaction gases, an annular member secured within said opening and having a first annular passageway therein, a plurality of circumferentially spaced fluid expulsion nozzles connected to said annular member and in communication with said first passageway, a hollow plug member positioned concentrically within said annular member in spaced relationship thereto and together with said annular member defining a plug nozzle, the interior of said plug member being in communication through a port therein with the interior of said casing and containing a substance that is fluid at least during operation of the reaction motor, means within said plug member defining a second annular passageway, said second passageway being in communication with the hollow interior of said plug and underlying a substantial portion of the outer surface thereof, a plurality of hollow struts connected to and extending between said annular member and said plug member and in communication with said first annular passageway, and means within said plug defining connecting passageways for interconnecting said second annular passageway with the hollow interiors of said struts, whereby a portion of the gases produced by said reaction gas generating means will flow through said port into the interior of said plug member and will force said fluid substance to flow into and through said second annular passageway, said connecting passageways, said struts, said first annular pasageway, and thence from said fluid expulsion nozzles, the flow of said fluid substance functioning to cool the external surfaces of the members through which it flows and to create thrust as it exhausts from said nozzles.

5. A reaction motor as recited in claim 4, wherein the external surface of said plug member is tapered whereby reaction gases will expand thereabout in a nearly isentropic manner.

6. A reaction motor as recited in claim 4, wherein said plug member includes an outer member and a hollow inner member secured in spaced-apart relationship to thereby define said second annular passageway, and wherein said connecting passageways are defined in part by a plurality of hollow, radially-extending braces secured within said hollow inner member.

7. A reaction motor as recited in claim 4, wherein said fluid expulsion nozzles are rotatable and are so arranged that the direction of the thrust created by the flow of said fluid therefrom may be varied in a plane lying parallel to the longitudinal axis of said motor, and including means for rotating said nozzles.

References Cited

UNITED STATES PATENTS

| | | | |
|---|---|---|---|
| 2,635,422 | 4/1953 | Landgraf | 60—35.6 |
| 2,799,990 | 7/1957 | Hausmann | 60—35.55 |
| 2,995,319 | 8/1961 | Kershner et al. | 244—52 |
| 3,000,176 | 9/1961 | Kuhrt | 60—35.6 |

FOREIGN PATENTS

| | | |
|---|---|---|
| 1,171,714 | 10/1958 | France. |
| 333,081 | 12/1935 | Italy. |

CARLTON R. CROYLE, *Primary Examiner.*

SAMUEL LEVINE, *Examiner.*